US006611585B1

(12) United States Patent
Carrion et al.

(10) Patent No.: US 6,611,585 B1
(45) Date of Patent: Aug. 26, 2003

(54) METHOD AND APPARATUS FOR INTELLIGENT RELEASE LINK TRUNK

(75) Inventors: Carlos Carrion, Rowlett, TX (US); Steven W. Craycraft, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/504,555

(22) Filed: Feb. 15, 2000

(51) Int. Cl.[7] .......................... H04M 3/00; H04M 3/51; H04M 3/58; H04M 7/00

(52) U.S. Cl. ............................ 379/212.01; 379/218.02; 379/221.01; 379/221.12; 379/265.01; 379/258; 379/262; 379/230

(58) Field of Search ....................... 379/212.01, 218.01, 379/218.02, 219, 220.01, 221.01, 221.08, 221.12, 230, 265.01, 265.02, 258, 260, 261, 262

(56) References Cited

U.S. PATENT DOCUMENTS 5,416,834 A * 5/1995 Bales et al. ............ 379/211.02
5,436,962 A * 7/1995 Hirata ................... 379/212.01
5,590,186 A * 12/1996 Liao et al. ............. 379/211.02
5,590,187 A * 12/1996 Greenspan ............. 379/212.01
5,617,471 A * 4/1997 Rogers et al. ......... 379/212.01
5,987,118 A * 11/1999 Dickerman et al. .... 379/265.01
6,188,761 B1 * 2/2001 Dickerman et al. .... 379/265.01
6,424,707 B1 * 7/2002 Chatterjee .............. 379/212.01

* cited by examiner

*Primary Examiner*—Harry S. Hong
(74) *Attorney, Agent, or Firm*—Haynes and Boone, L.L.P.

(57) ABSTRACT

A system and method to connect a caller to a callee through the services of an operator, the method comprising: connecting the caller to the operator through an origination switch; connecting the operator to the callee through a destination switch; sending a release message to the destination switch with a request for a callee address; receiving the address at the operator; sending a release message to the origination switch with the callee address; and connecting the callee with the caller by utilizing the callee address. The method can also include putting the callee on hold at the destination switch and sending the callee address from the destination switch. The method can also include putting the caller on hold at the origination switch while receiving the callee address from the operator. The operator can be an automated operator, a manual operator, or a private branch exchange, for example. The network can be an asynchronous transfer mode network and, or an Internet Protocol network, for example.

17 Claims, 1 Drawing Sheet

102
114
112 ORIGINATION SWITCH
108 SSP
130
110 BRIDGING SWITCH
136 RLT
116 ACD
132
134
OPERATOR CONSOLES 117
SSP 118
120 DESTINATION SWITCH
122

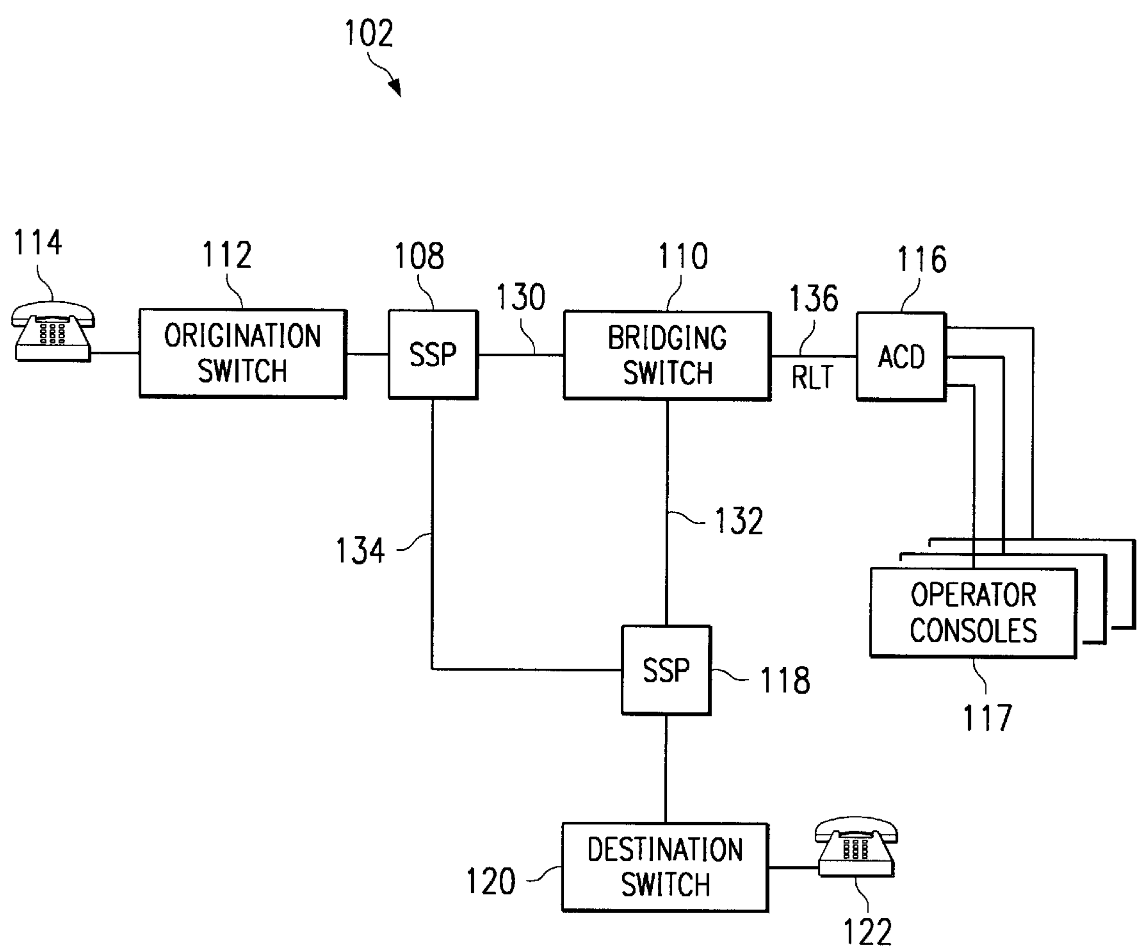
102
114
112
ORIGINATION SWITCH
108
SSP
130
110
BRIDGING SWITCH
136
RLT
116
ACD
134
132
OPERATOR CONSOLES
117
SSP
118
120
DESTINATION SWITCH
122

METHOD AND APPARATUS FOR INTELLIGENT RELEASE LINK TRUNK

FIELD OF THE INVENTION

The present invention relates generally to telecommunications, and more particularly, to a method and apparatus for an intelligent release link trunk.

BACKGROUND

In today's environment of increased competition and technological advancements in the telecommunications industry, service providers are constantly offering new products and services (hereinafter "services") to their customers. In order to support the new services, a wide variety of new and revised network components are continuously being deployed into the telecommunications network. Many of these new services are provided by automated systems that require little or no human intervention. Typically, customers interact with such systems by responding to digitized voice prompts provided by audio response units (ARUs) and the like. Customers typically enter data and select options by using their telephone keypads which generate Dual Tone Multi-Frequency (DTMF) signals. Alternatively, some automated systems are equipped with voice recognition devices that allow customers to enter data and select options by speaking into their telephone handsets.

An example of a service that is typically provided by an automated platform is a telephone debit card service. Such services allow customers to make long distance telephone calls using prepaid cards (also referred to as "debit cards"). The debit cards are generally purchased by customers in predetermined dollar amounts. Once purchased, customers dial the telephone number printed on the card to access a particular automated debit card service platform. This telephone number is referred to herein as the "access number". Customers are then prompted to enter their account and personal identification numbers (PINs). Such numbers are typically printed on the debit card product. After such numbers are verified by the system, long distance telephone calls are charged against a debit card account associated with the debit card. The debit card accounts are setup and maintained by the service provider and are accessible by debit card service platform associated with the telephone number printed on the card.

Telecommunication platforms referred to herein as "intelligent overlay networks" comprise computer and telecommunication elements used to implement a variety of automated telecommunication services. For example, an intelligent overlay network used to implement a debit card service typically comprises: (1) a database containing debit card account information, (2) a computer controller, (3) an ARU, and (4) a conventional telecommunication switch.

Additionally, it is often desired to provide callers with an option to connect with human operators and/or customer service personnel. For example, callers equipped with rotary telephones often require operator assistance because they cannot interact with automated platforms that respond only to DTMF signals. Furthermore, customers needing additional operating instructions or instructions spoken in different languages, often need to be connected with customer service representatives. In addition, because service providers often lock customer PINs when fraud is suspected, customers often need to connect with customer service representatives to have their PINs unlocked. These are just a few of many examples that demonstrate why it is desirable to allow customers to connect with live operators from such automated service platforms.

Generally, conventional operator and customer services are provided by network platforms referred to herein as "intelligent networks". Typically, when operator services are desired, calls are transferred to such intelligent networks. Once a call is transferred, operators can be used to assist callers and to complete calls. Traditionally, when a person makes an operator assisted call, the caller gets connected to an operator, the operator then connects to the destination and then bridges the two calls together and then releases his connection to the two calls. This method of connecting calls is not very efficient since extra resources are used to bridge the calls and since the route of the calls is optimized for caller to operator and operator to the callee, and not the caller to the callee.

Therefore, a system and method that improves the current method of providing operator services is needed.

SUMMARY OF THE INVENTION

In contrast to the prior art, the present invention provides an improved method for providing manual and automated operator services. The improved method and system reduces the number of ports utilized during an operator assisted call is optimized by providing the address of the terminating node to the originating node. This allows the network to establish a direct path between parties thus minimizing the number of ports and other network resources used in making the connection.

In addition, a system and method to connect a caller to a callee through the services of an operator is described. The method may comprise: connecting the caller to the operator through an origination switch; connecting the operator to the callee through a destination switch; sending a release message to the destination switch with a request for a callee address; receiving the address at the operator; sending a release message to the origination switch with the callee address; and connecting the callee with the caller by utilizing the callee address. The method can also include putting the callee on hold at the destination switch and sending the callee address from the destination switch. The method can also include putting the caller on hold at the origination switch while receiving the callee address from the operator. The operator can be an automated operator, a manual operator, or a private branch exchange, for example. The network can be an asynchronous transfer mode network and, or an Internet Protocol network, for example.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 1 illustrates a network diagram of the preferred embodiment.

DETAILED DESCRIPTION

Now referring to FIG. 1, the telecommunications network 102 provides functionality for operator and customer services. An Automated Call Distributor (ACD) 116 is a digital matrix switch enhanced with software to provide call queuing and call distribution functions. The ACD 116 is coupled with the Service Switching Point ("SSP" and generally referred to as the "switch") 108 via the bridging switch 110.

In turn, the SSP 108 is connected to the origination switch 112 which connects to the caller 114.

The bridging switch 110 can be any digital matrix switch that is capable of supporting release link trunk (RLT) technology. An RLT 136 is a voice trunk that connects the ACD 116 with the bridging switch 110. RLT technology is used to transfer calls by sending a RELEASE message to a bridging switch 110.

For example, in the prior art, when the caller 114 wants to make an operator assisted call, the call gets connected through the origination switch 112 and the SSP 108 to the bridging switch 110. The bridging switch 110 then connects the call over a first RLT 136 channel to the ACD 116. Once an operator 117 receives the call and the callee information, the ACD 116 is used to originate a second call over a second RLT 136 channel. The second call first goes through another SSP 118 and gets terminated at the callee 120 through the destination switch 122. When the second call connection is complete, a RELEASE message is sent to the bridging switch 110. This causes the bridging switch 110 to bridge the connections between the first and second calls. The ACD is then released from both calls, thereby freeing both RLT 136 channels from the connection. At this point, the RLT 136 channels can be reused for subsequent calls. However, the line 130 between the SSP 108 and the bridging switch 110 and the line 132 between the bridging switch 110 and the SSP 118 are both used to connect the call, and may not represent the most efficient path to connect the caller 114 and the callee 122.

In contrast, the method and system of the present invention reduces the amount of network resources required for an operator assisted call. In order to optimize the number of ports used for the call, the operator provides the originating side of the call with the exact location of the destination switch 120. Given the same example above, the caller first connects to the operator as stated above. However, after the operator connects to the callee, the operator then sends a special RELEASE message to both parties, first to the destination switch 120 and then to the origination switch 112. The special part of the RELEASE message sent to the destination switch 112 is the request to provide its Asynchronous Transfer Mode End System Address (AESA) or Internet Protocol (IP) address and port number (AESA for ATM networks and IP address for IP networks). The destination switch 120 then acknowledges the release message and puts the callee 122 on hold. Once the operator receives the acknowledgment of the RELEASE message from the destination switch 120 with its AESA address, the operator then sends a special RELEASE message with the destination switch's AESA address. The origination switch 112 will then put the caller 114 on hold and send a release acknowledgment to the operator. After the operator gets the acknowledgment message from the origination switch 112, all resources held by the operator will be released and a direct path will be established by the caller 114 to the callee 122. Both parties are then connected by line 134.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A telecommunications network for offering operator assisted calls, the system comprising:

an origination switch connecting a caller to the network;

a bridging switch within the network and connected to the origination switch;

an automatic call distributor within the network and connecting the bridging switch to an operator;

a destination switch connecting a called party to the network;

means for connecting the caller to the operator;

means for connecting the operator to the callee; and means for signaling the callee to provide the operator a respective callee address and;

means for signaling the caller from the operator to provide the callee address.

2. The network of claim 1, further including means for putting the callee on hold at the destination switch and sending the callee address from the destination switch.

3. The network of claim 1, further including means for putting the caller on hold at the origination switch while receiving the callee address from the operator.

4. The network of claim 1, wherein the operator is an automated operator.

5. The network of claim 1, wherein the operator is a manual operator.

6. The network of claim 1, wherein the operator is a private branch exchange.

7. The network of claim 1, wherein the network is an asynchronous transfer mode network.

8. The network of claim 2, wherein the network is an Internet Protocol network.

9. A method to connect a caller to a callee through the services of an operator, the method comprising:

connecting the caller to the operator through an origination switch;

connecting the operator to the callee through a destination switch;

sending a release message to the destination switch with a request for a callee address;

receiving the address at the operator;

sending a release message to the origination switch with the callee address; and connecting the callee with the caller by utilizing the callee address.

10. The method of claim 9, further including putting the callee on hold at the destination switch and sending the callee address from the destination switch.

11. The method of claim 9, further including putting the caller on hold at the origination switch while receiving the callee address from the operator.

12. The method of claim 9, wherein the operator is an automated operator.

13. The method of claim 9, wherein the operator is a manual operator.

14. The method of claim 9, wherein the operator is a private branch exchange.

15. The method of claim 9, wherein the connecting the callee with the caller connects the caller through an asynchronous transfer mode network.

16. The method of claim 9, wherein the connecting the callee with the caller connects the caller through an Internet Protocol network.

17. A method in an asynchronous transfer mode network to connect a caller to a callee through the services of an operator, the method comprising:

connecting the caller to the operator through an origination switch;

connecting the operator to the callee through a destination switch;

a sending a release message to the destination switch with a request for a callee address;

receiving the address at the operator from the callee destination switch while the destination switch puts the callee on hold;

sending a release message to the origination switch with the callee address;

receiving the callee address from the operator while putting the caller on hold; and connecting the callee with the caller by utilizing the callee address.

* * * * *